US008223072B2

(12) United States Patent
Ponnuswamy

(10) Patent No.: US 8,223,072 B2
(45) Date of Patent: Jul. 17, 2012

(54) MULTI-PATTERN WIRELESS FRAME TRANSMISSION

(75) Inventor: Subburajan Ponnuswamy, Scotts Valley, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 177 days.

(21) Appl. No.: 12/432,614

(22) Filed: Apr. 29, 2009

(65) Prior Publication Data

US 2010/0277368 A1 Nov. 4, 2010

(51) Int. Cl.
*H01Q 3/02* (2006.01)

(52) U.S. Cl. .......................................................... 342/374

(58) Field of Classification Search .................. 342/374, 342/367, 436

See application file for complete search history.

(56) References Cited

U.S. PATENT DOCUMENTS 7,421,012 B1 * 9/2008 Feng et al. .................... 375/148
7,511,663 B2 * 3/2009 Wang et al. ................... 342/367
2008/0051097 A1 * 2/2008 Kwon ........................... 455/450
2009/0150537 A1 * 6/2009 Fanson .......................... 709/224

OTHER PUBLICATIONS

"The Pin Diode Circuit Designers' Handbook", Microsemi-Watertown, 1998, pp. 1-137, Microsemi Corporation.

* cited by examiner

*Primary Examiner* — Harry Liu

(74) *Attorney, Agent, or Firm* — Blakely, Sokoloff, Taylor & Zafman LLP

(57) ABSTRACT

Multi-pattern transmission of wireless frames. A digital device contains a transmitter feeding an electronically steerable antenna system where the radiation pattern produced by the antenna system may be selected. Different antenna radiation patterns are used in transmitting a first portion of a wireless frame and a second portion of a wireless frame in a wireless digital network. In one embodiment, a first portion of a wireless frame is transmitted using a wide radiation pattern while the second portion of the frame is transmitted using a second radiation pattern. Switching among radiation patterns in the electronically steerable antenna system may be accomplished by switching between antenna types, such as an omnidirectional antenna for the wide pattern, and beam-steered or sectorized antennas for the second radiation pattern. Beamforming and/or phasing approaches may also be used. The first and second portions of the frame may be transmitted at different power levels. For high throughput (HT) frames such as IEEE 802.11n frames, the non-HT preamble and L-Sig are taken as the first portion of the frame, with the HT-Sig, HT-training and HT-data portions of the frame taken as the second portion of the frame, transmitted using a narrower radiation pattern.

27 Claims, 4 Drawing Sheets

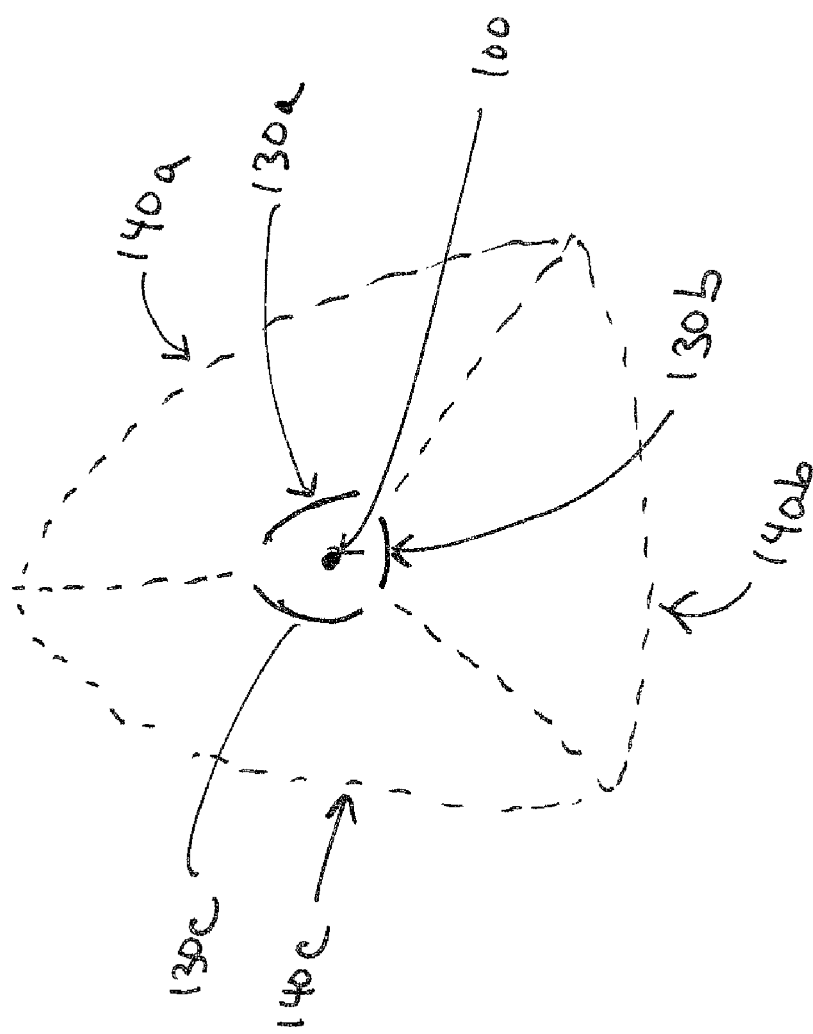
Fig 1
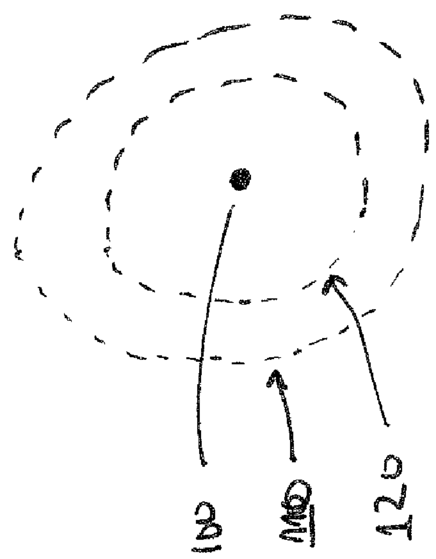

NON-HT PRE
L-SIG
HT SIG
HT TRAIN
HT-DATA
200
210
215
220
230
235
240
250

100
310
312
130a
314
130b
316
130c
318
300
365
360
370
350
TXD
ANT
380
390
500

MULTI-PATTERN WIRELESS FRAME TRANSMISSION

BACKGROUND OF THE INVENTION

The present invention relates to wireless digital networks, and in particular, to the problem of transmitting information in dense or crowded RF environments and improving the reliability of transmissions in any environment.

Wireless digital networks, such as those operating to IEEE802.11 Ethernet standards, use wireless access nodes connected to controllers and provide a wide range of services to wireless clients, such as access to infrastructure devices and services such as printers and file servers, as well as to the greater Internet. In RF-dense environments like those found in corporate offices, it is common to have many devices, wireless access nodes and wireless clients both, operating in close proximity.

When devices operate in close proximity, both in terms of physical location and radio frequencies, opportunities for interference arise. Such interference can occur not only when devices operate on the same channel, but when devices operate on partially overlapping or adjacent channels. As an example, in the U.S. 2.4 GHz ISM band, the three non-overlapping channels are 1, 6, and 11. Channels 1 and 3, for example, partially overlap. Channels 1 and 6 are adjacent, but they can still interfere with each other depending on the proximity of the devices and strength of transmissions. This 2.4 GHz band is also shared with services such as Bluetooth, wireless telephones, microwave ovens, and other devices which intentionally or unintentionally radiate RF energy.

The design of IEEE802.11 protocols alleviates these problems to a certain degree by implementing carrier sense and collision avoidance; before a device transmits on a channel, it first listens for activity. If it detects activity on the channel, it backs off for a minimum predetermined time or a randomly chosen time within a predetermined range, and checks again. In this "carrier sense" approach, the device senses for energy and carrier at the transmitter and defers the transmission if energy or carrier is detected, and it does not have the necessary intelligence to determine if the detected energy or carrier would actually interfere with its own transmission and vice versa.

It is known to the art that the "interference range" of a device is commonly greater than the "communications range," that is, a device is capable of causing interference to other devices at greater distances than it is capable of establishing communications.

What is needed is a better method of operating in RF environments.

BRIEF DESCRIPTION OF THE DRAWINGS

The invention may be best understood by referring to the following description and accompanying drawings that are used to illustrate embodiments of the invention in which:

FIG. 1 shows antenna patterns,

DETAILED DESCRIPTION

Figure 2:
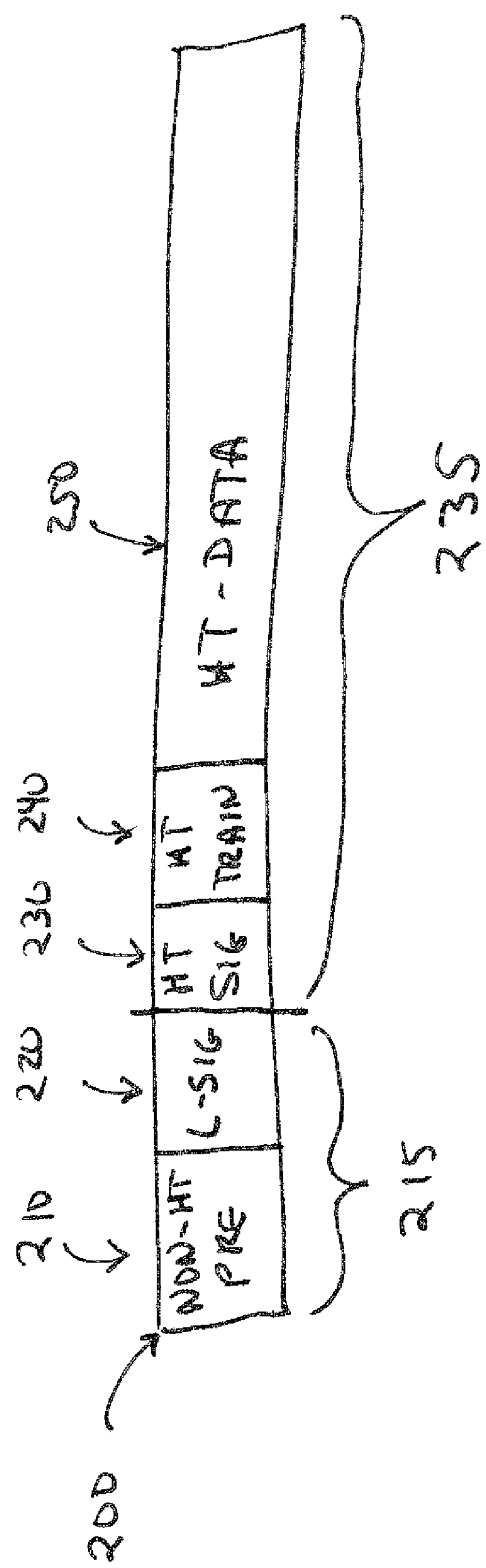
FIG. 2 shows a frame format.

Embodiments of the invention relate to methods of transmitting wireless data frames. According to the present invention, a digital device contains a transmitter feeding an electronically steerable antenna system where the radiation pattern produced by the antenna system may be electronically selected. A first portion of a wireless data frame such as a data frame according to one or more IEEE 802.11 standards is transmitted using an a first radiation pattern, and a second portion of the same frame is transmitted using a second radiation pattern. The first and second portions may be transmitted using an electronically steerable antenna system that supports the ability to switch or electronically alter radiation patterns. The antenna system may use one antenna with switchable elements, or may use different antennas with different radiation patterns. When multiple antennas are used, the first antenna may be an omnidirectional antenna, and the second antenna may be one of a group of antennas providing beam-forming or sectorized coverage.

FIG. 1 shows a representation of antenna radiation patterns. Omnidirectional antenna 100 when used to transmit information produces an omnidirectional radiation pattern, represented by circles 110 and 120. In wireless digital systems such as those operating under the various IEEE 802.11 standards, information is transmitted (and received) on channels in the 2.4 GHz and 5 GHz bands.

As is understood in the RF arts, interference can limit the effective range of communications. A transmitter and antenna such as 100 in FIG. 1 has an effective communications range shown by circle 120. Particularly in the 802.11 environment where the range of frequencies used by RF channels overlap and collision avoidance techniques are used, transmissions on the same or adjacent channels can cause interference to other devices, and can cause interference outside the ranges at which solid data transfers are possible. This interference range is shown as circle 110 of FIG. 1, covering more area than the communications range shown by circle 120.

An approach to improving communications is to use directional antennas to direct more RF energy to the desired receiver, such as by using antennas with directional patterns rather than omnidirectional patterns. Also shown in FIG. 1 are idealized radiation patterns for 120-degree sectorized antennas 130*a*, 130*b*, and 130*c*. Antenna 130*a* has a radiation pattern filling sector 140*a*, antenna 130*b* has a radiation pattern filling sector 140*b*, and antenna 130*c* has a radiation pattern filling sector 140*c*. Other approaches in addition to such sectorized, adaptive beam-forming, or smart antennas are often described as electronically steerable and rely on switching antennas and/or antenna elements, or altering the phasing between elements to increase antenna gain to try and mitigate interference and improve communications. Such electronically steered antennas may be used for transmission, reception, or both.

As is understood by the art, IEEE 802.11 wireless systems practice collision avoidance; prior to transmitting on a channel, a device monitors that channel for a predetermined period of time. If the device senses energy or carrier present on the channel, it backs off for a predetermined period of time, thus avoiding collisions which would occur if the device had started transmitting. It is understood that devices that are not within the directional pattern of another device, but are within the communication range, may not be able to hear the directional transmissions and hence may attempt to transmit causing further delays, collisions or interference. A well understood solution is to transmit a separate frame such as short CTS (Clear-to-Send) or equivalent frames in omnidirectional or another pattern prior to the directional transmission to prevent the devices outside of the directional pattern from attempting to transmit. This additional transmission of a separate frame prior to the beam-forming pattern incurs additional overhead thereby limiting the overall capacity.

According to an aspect of the invention, a device transmitting a digital frame of information transmits a first portion of the frame using a first antenna radiation pattern, switching to a second antenna radiation pattern at a predetermined point in the frame and transmitting the second portion of the frame using the second antenna radiation pattern. Transmit power delivered to the antenna system may also be varied between the first and second portions of the frame. The point at which the switching from one pattern to another occurs may vary per-frame depending on the nature and mode of transmissions. In one embodiment of frame-steering, the device transmits the first portion of the frame using a wide radiation pattern, such as the omnidirectional pattern 120 of FIG. 1, and the second portion of the frame using a narrower pattern, such as that shown using a sectorized antenna such as 130*a* producing pattern 140*a* of FIG. 1. The selection of the pattern used for the second portion of the frame depends on the location of the receiver. In an alternate embodiment, the first antenna radiation pattern may combine a wide radiation pattern with a narrower pattern, with only the narrower pattern being used for the second portion.

FIG. 2. shows a sample frame 200 according to 802.11 standards, in this case a high-throughput (HT) frame typical of IEEE 802.11n communications. Such a frame consists of a broadcast or legacy portion 215 which has a non-HT preamble 210, legacy protection and PLCP data (L-SIG) 220, followed by the HT portion 235 which includes HT-sig 230, HT-training 240, and HT-data 250. One of the purposes of the L-SIG header is to allow HT 802.11n frames to be identified by older legacy 802.11a/b/g devices which cannot decode 802.11n. The HT portion 235 of the frame includes identification 230 and training 240 fields as well as the data 250 field. For some frames, such as HT frames, different modulation methods may be used for the broadcast or legacy portion 215 of the frame and the data or HT portion 235 of the frame. As an example, for 802.11n, the broadcast or legacy portion 215 of frame 200 consists of legacy long and short training sequences and robust BPSK-OFDM modulation signal field, while the HT portion 235 of frame 200 consists of HT long and short training sequences, HT-SIG with BPSK-OFDM and HT-Data with one of the less robust and more efficient OFDM modulations, BPSK, QPSK 16-QAM or 64-QAM.

According to an aspect of the invention, for multi-pattern frames, the broadcast portion 215 of frame 200 is transmitted using the first antenna radiation pattern, and the second portion 235 of frame 200 is transmitted using the second narrower antenna radiation pattern. By transmitting broadcast portion 215 of frame 200 over a wider area, nearby devices will sense this portion of the frame and back off, while switching to a narrower antenna pattern for second portion 235 of frame 200 which includes data 250, and allows more RF energy to be delivered to the target device.

Figure 3:
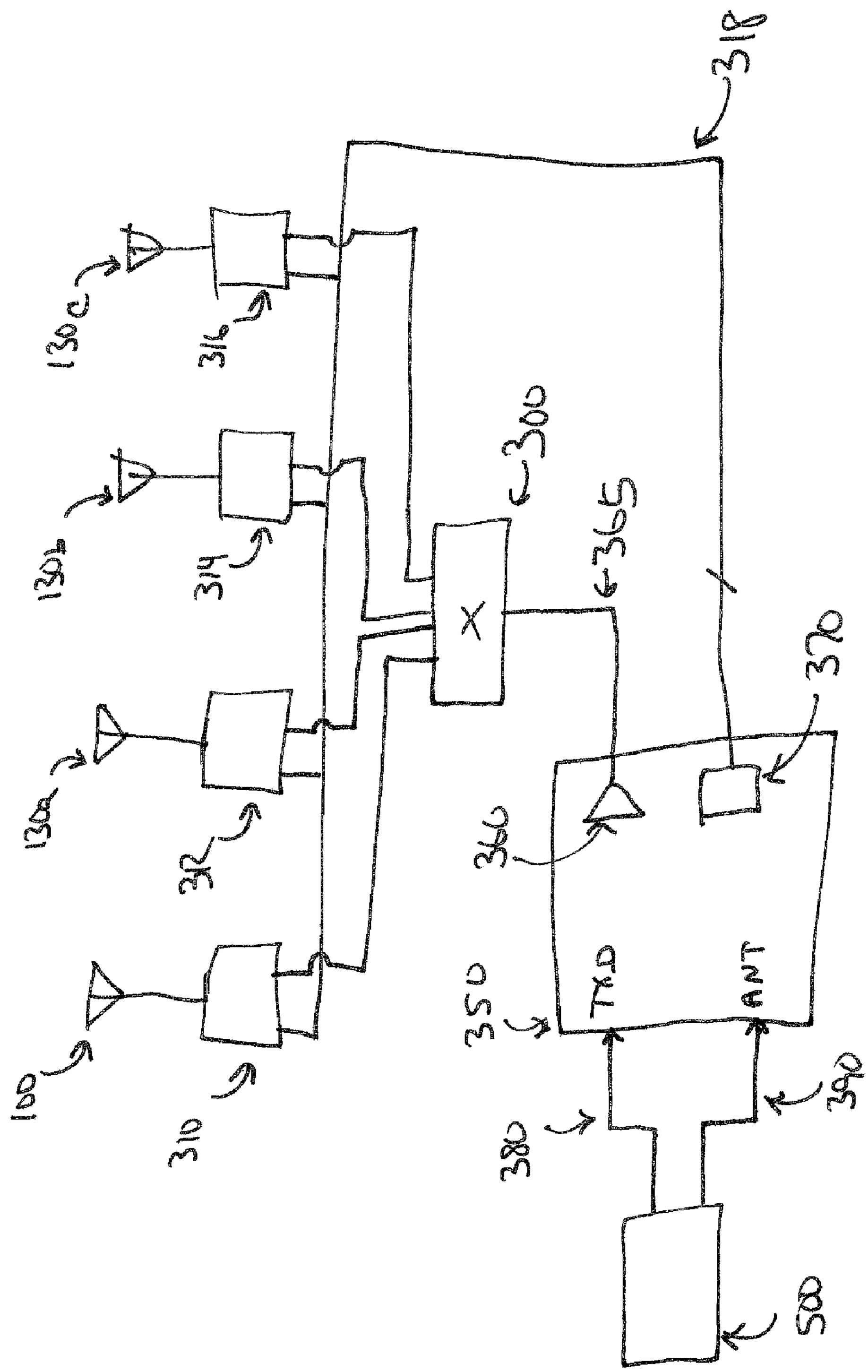
FIG. 3 shows a block diagram of a transmitter and antenna system.

FIG. 3 shows an embodiment of the invention. While the embodiment shows sectorized or switched antennas, it is equally applicable to other electronically steerable antenna systems. Antenna 100 is a broad-pattern antenna such as an omnidirectional antenna. Antennas 130*a*, 130*b*, and 130*c* are higher gain directional antennas such as sectorized antennas. As an example, three 120-degree sector antennas may be used, or four 90-degree sector antennas may be used.

These antennas 100, 130*a*, 130*b*, 130*c* are connected respectively to radio frequency (RF) switches 310, 312, 314, and 316. While these switches are preferably PIN diode switches, other technologies may also be used, provided they have the required switching speeds and isolation. As an example gated power amplifiers may be used. PIN diode switches for RF are known to the art, and are described for example in *The PIN Diode Circuit Designers' Handbook* published in 1998 by Microsemi Corporation, incorporated herein by reference. PIN diodes are available from numerous sources including Microsemi, Infineon, Vishay, and Avago Technologies. Switches are selected using control lines 318.

Switches 310, 312, 314, 316 are fed by RF distribution network 300, which may be a separate RF splitter such as those available from Mini-Circuits Corporation, or this functionality may be incorporated along with switches 310, 312, 314, 316.

The overall radiation pattern of an antenna may also be altered or steered by selecting elements of the antenna to feed, or by altering phasing among elements of an antenna or antenna array. Such an embodiment would have a block diagram similar to that of FIG. 3, where multiple elements 130*a*, 130*b*, 130*c* may be selected at any time, and/or the phasing of elements is varied. Switching antenna elements and/or altering phasing of elements may also be accomplished using PIN diode switches.

Transmitter 350 shown in block diagram form includes power amplifier 360 producing RF output 365 which feeds RF distribution network 300 and the switches and antennas. As shown, transmitter 350 includes antenna sequencer 370 which drives control lines 318 and controlling switches 310, 312, 314, 316. Transmitter 350 receives a transmit datastream 380 and antenna selection data 390 from controller 500. Portions of the transmitter such as local oscillators, mixers, I/Q modulators and the like not necessary to understand the invention are not shown.

According to the invention, when transmitting a multi-pattern frame, controller 500 provides transmitter 350 and its antenna sequencer 370 with information on which antenna pattern to use in the default configuration, such as for receiving, which antenna pattern to use for the first portion of the frame, and which antenna pattern to use for the second portion of the frame. Switching between the first and second patterns is initiated by transmitter 350 and its antenna sequencer 370.

As an example, transmitter 350 when transmitting a multi-pattern frame 200, first selects switch 310 and antenna 100 for the first portion of the frame, for example, broadcast portion 215 of FIG. 2. During transmission of the second portion 235 of frame 200, transmitter 350 switches off switch 310 and antenna 100 and switches on one of switches 312, 314, 316 and accompanying antenna 130*a*, 130*b*, 130*c*. Thus the first portion 215 of frame 200 is transmitted using a wide pattern, and the second portion 235 of frame 200 is transmitted using a narrow pattern.

In another example, transmitter 350 when transmitting a multi-pattern frame 200 selects switch 310 with antenna 100, and one of switches 312, 314, 316 and accompanying antenna 130*a*, 130*b*, 130*c*. The first portion 215 of frame 200 is thus transmitted using wide-coverage antenna 100 and one of the sectorized antennas. For the second portion 235 of frame 200, switch 310 and thus antenna 100 are disabled, so only the enabled sectorized antenna 130*a*, 130*b*, or 130*c* is used for transmitting. This results in the first portion 215 of frame 200 being transmitted using a combined wide and narrow pattern, with the second portion 235 only being transmitted using the narrow pattern.

Figure 4:
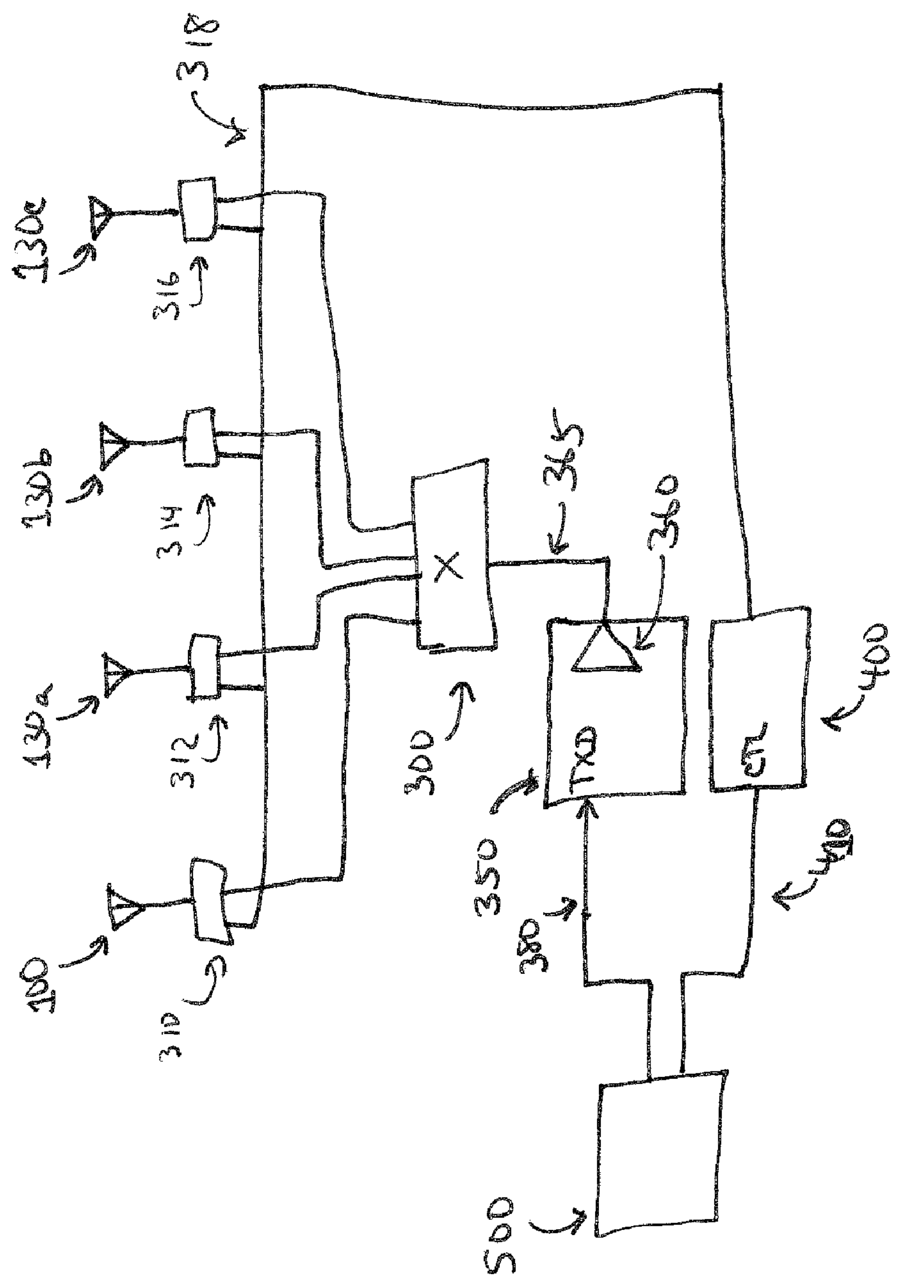
FIG. 4 shows another block diagram of a transmitter and antenna system.

According to the invention, a second embodiment is shown in FIG. 4. Where transmitter 350 of FIG. 3 generates antenna switching signals 318 directly, and thus must be designed and implemented in accordance with the invention, the embodiment of FIG. 4 uses an unmodified transmitter 350 and implements antenna switching along side the transmitter. This embodiment may be more applicable for use with standard designs and/or prebuilt transmitter and transmitter/receiver assemblies. Antenna selection 318 is provided by antenna controller 400 which receives antenna data 410 from controller 500. In such an embodiment, antenna pattern switching is timing based. When a multi-pattern frame is to be transmitted, controller 500 sends to antenna controller 400 information on which antenna pattern is to be enabled for the first period, the time of the first period, and information on which antenna pattern is to be used for the second period.

As an example, using a frame 200 such as shown in FIG. 2, the time required to transmit the first portion 215 of frame 200 is predetermined by controller 500. This time may vary from frame to frame, and over frame types. Controller 500 sends 410 antenna selection information and timing information to antenna controller 400. When controller 500 begins sending transmit data 380 to transmitter 350, controller 500 also signals 410 for antenna controller 400 to start its timing cycle. Assume antenna controller 400 has a counter chain which has been loaded with the time required to transmit the first portion 215 of frame 200. Antenna controller 400 begins counting when transmission begins, as signaled by controller 500. When the count completes, antenna controller 400 switches antennas as selected. Microsecond resolution is adequate for such a counter. This may be implemented, for example, using programmable logic such as a CPLD or FPGA for antenna controller 400, a counter-driven state machine, or even using a high-speed counter chain in a dedicated microprocessor. Suitable CPLDs and FPGAs are available from manufacturers such as Lattice Semiconductor, Altera, Xilinx, Atmel, and Cypress.

As with the embodiments of FIG. 3, in a first embodiment of FIG. 4 when transmitting a multi-pattern frame 200, controller 500 commands antenna controller 400 to select switch 310 and antenna 100 for the first portion of the frame, for example, broadcast portion 215 of FIG. 2. Controller 500 also sends antenna controller 400 the duration of the first portion of the frame, and the antenna to select when this portion is complete. Controller 500 then signals the start of the transmission, sending data 380 to transmitter 350. When the counter in antenna controller 400 expires, it switches off switch 310 and antenna 100 and switches on one of switches 312, 314, 316 and accompanying antenna 130*a*, 130*b*, 130*c*.

In an alternate embodiment, when transmitting a multi-pattern frame 200, controller 500 commands antenna controller 400 to select switch 310 with antenna 100, and one of switches 312, 314, 316 and accompanying antenna 130*a*, 130*b*, 130*c*. Controller 500 also sends antenna controller 400 the duration of the first portion of the frame. Controller 500 then signals the start of the transmission, sending data 380 to transmitter 350. The first portion 215 of frame 200 is thus transmitted using wide-coverage antenna 100 and one of the sectorized antennas. When the counter in antenna controller 400 expires, it switches off switch 310 and antenna 100, so only the enabled sectorized antenna 130*a*, 130*b*, or 130*c* is used for transmitting.

According to another embodiment of the invention in FIG. 3 or 4, controller 500 also sends the duration of the second portion of the frame, the antenna pattern to be used for receiving subsequent response frames, and duration for staying in the same pattern for receive mode, in addition to the first portion's duration and antenna patterns. The antenna controller switches to receive mode after the duration of the second portion is completed and/or transmit-to-receive transition is detected by other means so as to receive a response frame such as 802.11 Acknowledgement or 802.11 Block Acknowledgment using the same pattern used for the second portion of the frame, or a different pattern.

In all embodiments, the antenna controller is instructed to use a specific or default pattern for reception. As an example, in 802.11 the radio is always in receive mode unless the radio is transmitting a frame or sequence of frames.

According to an aspect of the invention, for multi-pattern frames, the broadcast portion 215 of the frame 200 is transmitted using the first antenna radiation pattern and a first transmit power level, and the second portion 235 of the frame 200 is transmitted using the second narrower antenna radiation pattern and a second power level. By transmitting broadcast portion 215 of frame 200 using a different transmit power, the interference range is controlled effectively, while switching to a narrower antenna pattern and a different transmit power for second portion 235 of frame 200 which includes data 250, and allows more RF energy to be delivered to the target device increasing the reliability of the communication. The differences in power levels may be implemented using a combination of power-amplifier control, controlling the drive level to the power amplifier, and/or switching attenuators between the transmitter and the antenna.

It should be noted that not all frames need be transmitted using the multi-pattern capability; selection of frames for multi-pattern transmission, as well as transmit power levels and the antenna patterns to be used is made by controller 500, or by other control elements of the larger system in which the transmitter is embedded.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. In a digital device having a transmitter and an electronically steerable antenna system with selectable antenna radiation patterns, a method comprising:

switching the antenna system to a first antenna radiation pattern;

transmitting a first portion of a frame using the first antenna radiation pattern, the frame comprises one or more preambles and a single data portion associated with the one or more preambles;

switching the antenna system to a second radiation pattern; and transmitting a second portion of the frame using the second antenna radiation pattern.

2. The method of claim 1 wherein the first antenna radiation pattern is a wide radiation pattern.

3. The method of claim 1 wherein the first radiation pattern includes an omnidirectional radiation pattern.

4. The method of claim 1 wherein the second radiation pattern is a directional radiation pattern.

5. The method of claim 1 wherein the second radiation pattern is a narrow radiation pattern.

6. The method of claim 1 wherein the first and second portions of the frame are transmitted using different transmit power levels.

7. The method of claim 1 wherein the first and second portions of the frame use different modulation methods.

8. The method of claim 1 wherein the frame is a high-throughput (HT) frame.

9. The method of claim 8 wherein the first portion of the frame includes a non-HT preamble and the second portion of the frame contains HT data being the data portion of the frame.

10. The method of claim 1 wherein switching the antenna radiation pattern is under control of the transmitter.

11. The method of claim 1 wherein switching the antenna radiation pattern is under control of an antenna controller.

12. The method of claim 1 wherein the transmitting the second portion of the frame using the second antenna radiation pattern is conducted by a single transmitter being a single physical layer that also transmits the first portion of the frame using the first antenna radiation pattern.

13. The method of claim 1 wherein the transmitting of the first portion of the frame and the transmitting of the second portion of the frame collectively transmits only a single data field including the data portion.

14. The method of claim 1 wherein the transmitting of the first portion of the frame is performed by broadcasting the first portion of the frame using the first antenna radiation pattern, the first portion consists of a first preamble of the one or more preambles and information to allow the frame to be identified without decoding the frame.

15. The method of claim 14 wherein the transmitting of the second portion of the frame is performed using the second antenna radiation pattern that is narrower than the first antenna radiation pattern, the second portion comprises the data portion associated with a second preamble of the one or more preambles.

16. In a digital device, a digital transmission system comprising:

a transmitter for transmitting a digital frame including one or more preambles and a single data portion associated with the one or more preambles;

an electronically steerable antenna system coupled to the transmitter, the antenna system having a plurality of electronically selectable radiation patterns; and a controller for controlling the transmitter and the antenna system, the controller commanding the transmitter and antenna system to transmit the digital frame using (i) a first antenna radiation pattern for a first portion of the digital frame and (ii) a second antenna radiation pattern for a second portion of the digital frame.

17. The digital device of claim 16 wherein the first radiation pattern is a wide radiation pattern.

18. The digital device of claim 16 wherein the first radiation pattern includes an omnidirectional radiation pattern.

19. The digital device of claim 16 wherein the second radiation pattern is a directional radiation pattern.

20. The digital device of claim 16 wherein the second radiation pattern is a narrow radiation pattern.

21. The digital device of claim 16 wherein the first and second portions of the digital frame are transmitted using different transmit power levels.

22. The digital device of claim 16 wherein the first and second portions of the digital frame use different modulation methods.

23. The digital device of claim 16 wherein switching the antenna system from the first radiation pattern to the second radiation pattern is controlled by the transmitter being a single physical layer.

24. The digital device of claim 16 wherein switching the antenna system from the first radiation pattern to the second radiation pattern is controlled by an antenna controller.

25. The digital device of claim 16 wherein the transmitter being a same physical layer that transmits the digital frame using (i) the first antenna radiation pattern when transmitting the first portion of the digital frame and (ii) the second antenna radiation pattern when transmitting the second portion of the digital frame.

26. The digital device of claim 16 wherein the digital frame includes the first portion that comprises a first preamble of the one or more preambles and the second portion comprises a second preamble of the one or more preambles and the data portion within the frame.

27. The method of claim 26 wherein the digital frame is in accordance with IEEE 802.11 standards.

* * * * *